US008813033B2

(12) United States Patent
Sreedhar

(10) Patent No.: US 8,813,033 B2
(45) Date of Patent: Aug. 19, 2014

(54) SYSTEM AND METHOD FOR STATIC ANALYSIS USING FAULT PATHS

(75) Inventor: Vugranam Chakravarthy Sreedhar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1315 days.

(21) Appl. No.: 12/132,018

(22) Filed: Jun. 3, 2008

(65) Prior Publication Data

US 2008/0276228 A1 Nov. 6, 2008

Related U.S. Application Data

(63) Continuation of application No. 11/183,157, filed on Jul. 15, 2005, now abandoned.

(51) Int. Cl.
*G06F 9/44* (2006.01)
*G06F 9/45* (2006.01)

(52) U.S. Cl.
USPC ............ 717/124; 717/131; 717/141; 717/143

(58) Field of Classification Search
CPC ..... G06F 8/427; G06F 8/443; G06F 11/3466; G06F 11/3688
See application file for complete search history.

(56) References Cited

U.S. PATENT DOCUMENTS

| | | | | |
|---|---|---|---|---|
| 7,316,005 B2 * | 1/2008 | Qadeer et al. | ................. | 717/131 |
| 7,539,977 B1 * | 5/2009 | Bloom | .......................... | 717/124 |
| 7,661,097 B2 * | 2/2010 | Mukkavilli | ................... | 717/143 |
| 8,146,058 B2 * | 3/2012 | Sarkar et al. | .................. | 717/124 |
| 8,683,441 B2 * | 3/2014 | Keidar-Barner et al. | ..... | 717/124 |
| 2003/0046609 A1 * | 3/2003 | Farchi et al. | ..................... | 714/30 |
| 2004/0117772 A1 * | 6/2004 | Brand et al. | ................... | 717/132 |
| 2005/0223357 A1 * | 10/2005 | Banerjee et al. | .............. | 717/120 |
| 2005/0235264 A1 * | 10/2005 | Hines | ............................ | 717/124 |
| 2005/0235265 A1 * | 10/2005 | Allen | ............................ | 717/126 |
| 2006/0248519 A1 * | 11/2006 | Jaeger et al. | ................... | 717/141 |
| 2007/0250820 A1 * | 10/2007 | Edwards et al. | .............. | 717/131 |

OTHER PUBLICATIONS

D. Brand, IBM Watson Research Center, Error Detection by Data Flow Analysis Restricted to Executable Paths, 1999, 22 pages, <http://www.research.ibm.com/da/publications/beam_data_flow.pdf>.*
Chen et al., Algorithms for compacting error traces, Jan. 2005, 5 pages.*
Livshits et al., Tracking pointers with path and context sensitivity for bug detection in C programs, Sep. 2003, 10 pages.*
Vipindeep V et al., Efficient static analysis with path pruning using coverage data, Jul. 2005, 6 pages.*
L.O. Andersen, "Program analysis and specialization for the C Programming language", Technical report, PhD Thesis, DIKU, University of Copenhagen, Denmark, May 1994; pp. 1-297.
T. Ball et al., "From Symptom to Cause: Localizing Errors in Counterexample Traces", In PPOL '03: Proceedings of the 30th ACM SIGPLAN-SIGACT symposium on Principle of Programming languages, New Orleans, LA, Jan. 2003; 9 pages.

(Continued)

*Primary Examiner* — Thuy Dao
(74) *Attorney, Agent, or Firm* — Tutunjian & Bitetto, P.C.; Preston J. Young

(57) ABSTRACT

A system and method for analyzing a program includes determining possible bug paths in a program based on statistical analysis of test cases. A static analysis is then performed only on the possible bug paths. The bugs are then located in the program.

15 Claims, 6 Drawing Sheets

(56) References Cited

OTHER PUBLICATIONS

Daniel Brand, "A Software Falsifer", 1 I Int'l Symposium on Software Reliability Engineering, IEEE; 2000; pp. 174-185.

P.Cousot et al. "Abstract Interpretation: A Unified Lattice Model for Static Analysis of Porgrams by Construction of Approximation of Fixpoints", Fourth ACM Symposium on Principles of Programming Languages; 1977' pp. 238-252.

D. Engler et al., "Checking Systems Rules Using System-Specific, Programmer-Written Compiler Extensions", Proceeding of the Fourth Symposium on Operating Systems Design and Implementation, San Diego, CA; 2000; 16 pages.

Michael D. Ernst, "Static and dynamic analysis: Synergy and Duality", WODA 2003: ICSE Workshop on Dynamic Analysis; pp. 1-34; Portland, OR, (Republished Jun. 7, 2004).

Sumit Gulwani et al., "Discovering Affine Equalities Using Random Interpretration"; The 30th Annual ACM Symposium on Principles of Programming Languages; New Orleans, LA, 2003; pp. 74-84.

D. Hovemeyer et al.; Finding bugs is easy, SIPLAN Not., 39(12), 2004, 12 pages.

D. Jackson, et al.; "The future of Software Engineering, Chapter Software Analysis: A Roadmap" ACM Press, Jun. 2000; pp. 133-145.

Gary A. Kildall, "A Unified Approach to Global Program Optimization", First Annual ACM Symposium on Principles of Programming Languages, 1973, pp. 194-206.

V. Benjamin Livshits et al, "Tracking pointers with Path and Context Sensitivity for Bug Detection in C Programs" Proceedings of the 11th ACM SIGSOFT Int'l Symposium on the Foundations of Software Engineering; (FSE-11), 2003, pp. 317-326.

Roman Manevich et al.,"PSE: Explaining Program Failures via Postmortem Static Analysis", SIGSFOT '04/ FSE-12: Proceedings of the 12th ACM SIGSOFT Int'l Symposium on Foundations of Software Engineering, 2004; 10 pages.

Bjarne Steensgaard "Points-toAnalysis in Almost Linear Time", The 23rd Symposium on Principles of Programming Languages, pp. 32-41, 1996.

F. Tip, "A Survey of Program Slicing Technique" Journal of Programming Languages, 3; 1995; pp. 1-58.

Weimer et al.,"Finding and Preventing Run-Time Error Handling Mistakes", 19th Annual ACM Conference on Object-Oriented rogramming, Systems, Languages, and Applications (OOPSLA' 04) Oct. 2004; pp. 419-431.

M. Weiser, "Program Slicing" Proceedings of the 5th Int'l Conference on Software Engineering; IEEE Computer Society Press; 1981; pp. 439-449.

Andreas Zeller, "Isolating Cause-Effect Chains from Computer Program", SIGSOFT 2002/ FSE-10, Nov. 18-22, 2002; Charleston, SC USA; 10 pages.

V. Benjamin Livshits, "Findings Security Errors in Java Applications Using Lightweight Static Analysis", Computer Systems Laboratory, Stanford University, 2002(?), 2 pages.

D. Engler et al., "Bugs as Deviant Behavior: A General Approach to Inferring Errors in Systems Code" Computer Systems Laboratory, Stanford University, Stanford, CA; 2002(7), 17 pages.

D. Avots, et al., "Improving Software Security with a C Pointer Analysis", ICSE, May 15-21, 2005; St. Louis MO, 10 pages.

Various Authors, "Workshop on the Evaluation of Software Defect Detection Tools", Sunday, Jun. 12, 2005, Co-located with PLDI 2005; 78 pages.

\* cited by examiner

```
int Foo (int a) { int x;
int y = 0 ;
int z = 0 ;
int *p, *q ;
p = &y;
q = &z ;
if (a) {
*p = 0 ;
z = 1
}
else p = &x ;
q = p; // 1
if (z = 0) { // 2
printf ("Value of *q is %d \n", *q) ; //3
return *q ;
}
return 0 ;
}
```

FIG. 1

```
int Foo (int a) { int x; int y = 0 ;
int z = 0 ;
int *p, *q ;
p = &y;
q = &z ;
/* if (a) {
*p = 0 ;
z = 1
}
else */ p = &x ;
q = p; // 1
if (z = 0) { // 2
printf ("Value of *q is %d \n", *q) ; //3
return *q ;
}
/*return 0 ; */
}
```

FIG. 4

SYSTEM AND METHOD FOR STATIC ANALYSIS USING FAULT PATHS

RELATED APPLICATION INFORMATION

This application is a Continuation application of abandoned U.S. patent application Ser. No. 11/183,157 filed Jul. 15, 2005, incorporated herein by reference in its entirety.

BACKGROUND

1. Technical Field

The present invention relates to evaluation of program, and more particularly to systems and methods which determine program soundness.

2. Description of the Related Art

The soundness of analyses and algorithms has been a cornerstone in programming languages. A static analysis is said to be sound when the data flow information that it produces is guaranteed to be true on all program execution. Foundational theories like Meet-Over-All-Paths (MOAP) and Abstract Interpretation are the basis for sound static analysis.

Unfortunately, scalability becomes an issue when implementing precise and sound static analysis. Soundness of static analysis is extremely important for many applications, including code generation and code transformation. On the other hand, there are applications of static analysis where soundness is not very critical, such as for tracking bugs and defects. One can potentially construct a very simple and fast unsound static analysis to compute data flow information. Unfortunately, unsound static analysis can produce misleading data flow information, and in the context of bug finding tools, can potentially generate many false negatives and false positives.

Traditional static analysis based on foundational theories like the Meet-Over-All-Paths (MOAP), Maximal Fixed Point (MFP), and Abstract Interpretation may guarantee soundness of the static analysis. A static analysis is said to be sound when the data flow information that it produces is guaranteed to be true on all program execution. Soundness of static analysis is extremely important and critical for many applications of static analysis, such as code generation and optimization. There are applications of static analysis for which one can sacrifice soundness. For example, one can do away with soundness for finding bugs and defects.

A negative consequence of loosing soundness in such applications is increased reporting of false negatives. In software diagnosis, as in medical diagnosis, there are two kinds of error that can occur. A false positive is when there is no bug, but the results of the diagnosis come back as positive. A false negative is when there is actually a bug, but the results of diagnosis come back as negative. If a static analysis is unsound, the number of false negatives and sometimes even the number of false positives can be increased.

One major stumbling block in (sound) static analysis is the tradeoff between scalability and precision of the analysis. Typically, a scalable analysis is often less precise. Precision of the analysis has direct impact on the number of false positives. Precise static analysis often reduces the number of false positives.

Doing away with the soundness property of static analysis has been proposed to achieve scalability. In one such method, random interpretation is used for solving certain data flow problems and the resulting solution is not necessarily sound with respect deterministic MOAP. Another technique was presented in the context of model checking in SLAM for localizing faults in error traces by exploiting existence of correct traces. Delta debugging uses a correct program and a series of changes to the program to isolate the fault that caused the error.

A static analysis tool called PSE was employed to diagnose software failures. Given minimal information about a particular program failure, PSE automatically reconstructed a set of failing execution traces. PSE requires the specification of the failure in the form of type state information. An unsound pointer analysis was proposed which assumed that pointers passed into a procedure, in parameters, in global variables, and locations reachable from variables are all distinct.

Unsound static analysis techniques have been used on a number of bug patterns in programs for detecting such patterns. Unsound static analysis techniques have also been employed for finding a class of error-handling mistakes that arise from an improper release of resources.

Program slicing is another technique that is useful for detecting bugs and defects. A program slice is a set of all program statements that affect the value of a variable. In dynamic slicing only those statements that affect a particular test case are considered. Slicing focuses on finding statements that affect a particular value of a variable.

SUMMARY

The present invention is directed to address the question of how unsound is the data flow information generated by an unsound static analysis, and is it possible to distinguish between what is true from what is false using an unsound analysis.

A system and method for analyzing a program includes determining possible bug paths in a program based on statistical analysis of test cases. A static analysis is then performed only on the possible bug paths. The bugs are then located in the program.

Another method for analyzing a program includes determining a degree of unsoundness that can be tolerated for data flow information in a program and performing a static analysis on less than all possible paths based upon the degree of unsoundness. The data flow information is computed only on those paths that trigger a possible bug or defect, based on statistics, to find the bugs and defects in the program.

In alternate embodiments, the degree of unsoundness may be checked by measuring a distance between reference data and data of the program being considered. The distance may include a hamming distance. The step of performing a static analysis on less than all possible paths may include performing a meet over possible bug paths (mobp) analysis. The step of performing a meet over possible bug paths (mobp) analysis may include determining possible bug paths based on statistics of type and location of bugs in test case programs. The test case programs may include unit tests and/or regression tests. The method may further comprise determining fault locations in the program using a fault localization algorithm.

A system for determining faults in a program, includes a determination module which identifies possible bug paths in a program based on statistical analysis of test cases. A static analysis module performs a static analysis only on the possible bug paths identified by the determination module, and a fault localization module locates the bugs in the program.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 depicts programming code for an illustrative program for demonstrating aspects of the present invention;

FIG. 4 depicts the programming code of FIG. 1 having paths comment out to provide for an unsound analysis in accordance with an illustrative embodiment of the present invention;

DETAILED DESCRIPTION OF PREFERRED EMBODIMENTS

Figure 2A:
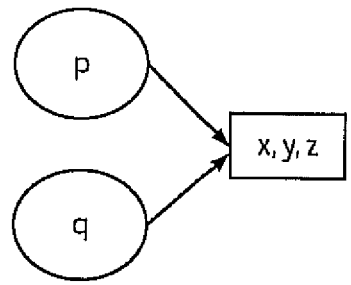
FIGS. 2A-2D depict points-to graphs using different techniques for the example program of FIG. 1.

Embodiments of the present invention determine soundness and conservativeness of programs and access their impact on static program analysis. In a particularly useful embodiment, failed test cases are employed to determine possible bug paths within a program. These bug paths are then employed for computing data flow information for the program. The systems and methods disclosed herein may be employed to more efficiently determine bugs and defects in software programs.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. The program can also be generated automatically from other programs. One approach may also be applied to find bugs in the computer program that generated the program. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an illustrative "C" program is shown to demonstrate and compare pointer analysis techniques. The program may be in C++ or any other kind of language, including e.g., Java, Fortran, etc. Pointer analysis of the program code of FIG. 1 will be employed as an example to discuss unsoundness of data flow information.

Figure 2B:
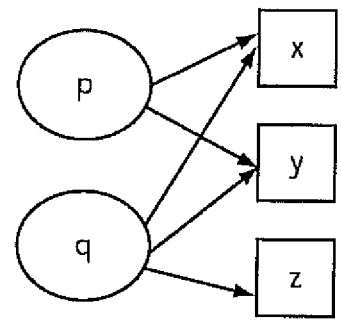

Referring to FIGS. 2A and 2B, points-to graphs obtained by the Steensgard algorithm (see e.g., Bjarne Steensgaard. Points-to analysis in almost linear time. in The 23rd Symposium on Principles of Programming Languages, pages 32-41, 1996) and by Anderson's algorithm (see e.g., L. O. Andersen. Program analysis and specialization for the C programming language. Technical report, PhD thesis, DIKU, University of Copenhagen, May 1994), respectively, are presented for the code shown in FIG. 1.

Figure 2C:
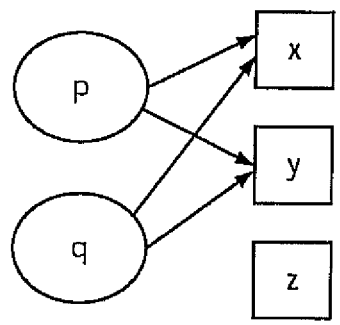
Figure 2D:
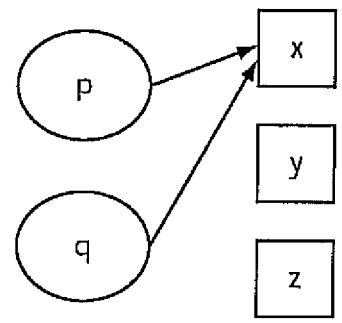

Both algorithms are flow insensitive, sound and conservative. Steensgard's algorithm has (almost) linear time complexity whereas Anderson's algorithm has cubic time complexity. Notice that Anderson's algorithm gives a more precise answer than Steensgard's algorithm. Using flow sensitive analysis one can compute a more precise points-to graph than Anderson's algorithm. FIG. 2C illustrates the points-to graph at statement 2 ("//2" in FIG. 1), obtained using a flow sensitive analysis. Notice that the graph is more precise than the Anderson algorithm. The points-to graph of FIG. 2C is an accurate model of the run-time behavior of the piece of code in FIG. 1, assuming all paths are feasible. The points-to graph of FIGS. 2A and 2B are conservative because of extra points-to edges, such as q→z. An unsound pointer analysis algorithm, for example, can produce a points-to graph as shown in FIG. 2D. The points-to graph of FIG. 2D is not correct (that is, it is unsound) because of the missing points-to edge q→y.

Conservativeness Versus Unsoundness

Meet over all paths (MOAP) may be the best or the most precise summary of data flow information that can be computed using static analysis. Let "actual" be the actual or the ideal data flow information at a program point, let "moap" be the meet over all path solution, and let "ssa" be the sound static analysis solution. Then, the following relation holds:

$$ssa \leq_s moap \leq_s actual$$

The relation ≤ indicates a sound, but "less accurate" or "conservative" partial order relation. In the context of pointer analysis, less accurate or conservative points-to information includes "extra" or "redundant" points-to relations. There have been many attempts to reduce the "gap" between ssa and moap. Path sensitive data flow analysis, for instance, attempts to obtain accurate ssa solutions by attempting to analyze all paths, and in the presence of loops there can be infinite number of such paths. Even for programs without loops the number of paths can be exponential, and hence such path sensitive static analyses are prohibitively expensive. One can also reduce the "gap" between moap and actual using tricks like elimination of infeasible paths, and thereby compute only a meet over all feasible paths solution.

Turning to the unsound solutions end of the spectrum. Unlike conservative data flow information, which includes "extra" or "unnecessary" information, such as extra points-to relations, in unsound data flow information there is "missing" data flow information, such as missing points-to relations. This can happen in several ways in an unsound analysis. For example, if a static analysis uses fixed-point iteration, with initial optimistic assumption, then an early termination of the iteration can give rise to an unsound result.

Consider the Anderson's algorithm for computing a flow insensitive points-to graph for the piece of code in FIG. 1. When processing the statement q=p, processing may prematurely terminate all the points-to nodes that p points to, when updating the points-to edges for q.

Let unsound(k) denote unsound data flow information, where k is a parameter that denotes the "distance" of unsound information from the actual. Let $\leq_u$ denote "unsound partial order". Then, the following relation is presented:

$$actual \leq_u unsound(k) \leq_u unsound(l)$$

where, $k \leq_d l$, where $\leq_d$ is a "distance relation".

The relation $\leq_u$ means that there is some missing data flow information in unsound(k) when compared to actual. In other words, actual is "less unsound" than unsound(k). In the case of pointer analysis, it can be intuitively stated that unsound(k) has k missing points-to information when compared to actual. Consider the points-to graph shown in FIG. 2D. This graph is unsound(2), since two of the actual points-to edge, p→y and q→y, are missing from the graph.

In one embodiment, hamming distance may be employed to define the degree of unsoundness and conservativeness. Bit strings may be employed to encode data flow information. For instance, a bit may be associated for each pair of variables (x, y) at a particular point p in a program. If x points to y, the bit is set to 1; otherwise, the bit is set to 0. Given two data flow information, D1 and D2, encoded using bit strings, the data flow hamming distance (DFHD) can be defined for D1 and D2 as the number of places where the bits differ. For example, let D1=011001 and let D2=111010, then DFHD between D1 and D2 is 3.

Unfortunately, the DFHD does not distinguish between unsoundness and conservativeness. In pointer analysis, conservativeness adds "extra" spurious points-to relations, whereas unsoundness "eliminates" useful points-to relations.

Consider once again the above bit string example D=011001, and consider only those bit positions [ ] whose value is 0, that is D1[0], D1[3], and D1[4]. The corresponding positions in D2 include D2[0]=1, D2[3]=0, and D2[4]=1. At bit positions 0 and 4, D2 is more conservative that D1, since corresponding to these two bit positions D2 includes a points-to relation when compared to D1. The conservative data flow hamming distance (CDFHD) of D2 from D1 is 2. Now, consider in D1 those bit positions whose value is 1, that is, D1[1], D1[2], and D1[5]. The corresponding positions in D2 include D2[1]=1, D2[2]=1, and D2[5]=0. At the bit position 5, D2 is unsound when compared to D1, and unsound data flow hamming distance (UDFHD) of D2 from D1 is 1. Keep in mind that unsoundness and conservativeness are relative terms and are complements of each other. If D2 has an UDFHD of 1 from D1, then D1 has a CDFHD of 1 from D2. Observe also that DFHD=CDFHD+UDFHD.

Meet Over Possible Bug Paths

Figure 3:
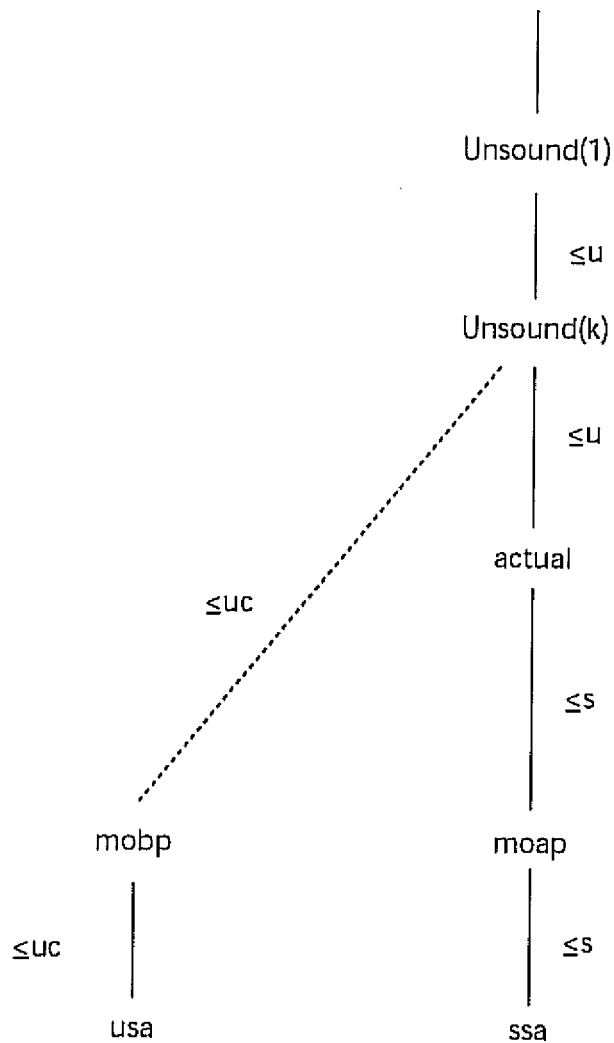
FIG. 3 is a diagram showing a spectrum for unsoundness and conservativeness.

Referring to FIG. 3, in general it is impossible to statically compute "actual", or for that matter moap for most non-trivial data flow problems. In FIG. 3, a spectrum of conservativeness and unsoundness is illustratively shown. A reason for having unsoundness is that not all paths have been examined. Unsoundness may be examined with respect to a specific application, e.g., that of finding bugs and defects. Using sound static analysis, all paths can be analyzed. Static analysis algorithms are sound with respect to moap. Also, the data flow information is merged at control flow join points.

A consequence of analyzing all paths and the subsequent merging of information is increased conservativeness of the data flow information. From the perspective of bug detection, the more conservative the data flow information is, the higher the number of false positives. Bugs do not usually occur on all paths, but occur only on certain paths (bugs that occur on all paths are easy to find and fix, so such bugs are of lesser concern).

Advantageously, the data flow information can be computed only on those paths that trigger the bug. This will reduce the number of false positives. Notice that the resulting data flow information will be unsound with respect to moap and even "actual".

Meet over possible bug paths (mobp) can be defined similarly to moap, except that the data flow information is computed only on possible bug paths. Therefore, one could say that mobp$\leq_{uc}$ unsound(k), where the subscript uc stands for unsound and conservative.

FIG. 3 illustrates the relationship between different kinds of sound and unsound data flow information. The unsound static analysis (usa) usa$\leq_{uc}$ mobp, may include "extra" or "unnecessary" data flow information compared to mobp. Given a sound static data flow analysis algorithm that computes some data flow information ssa', a similar unsound static data flow analysis algorithm can be constructed that computes the corresponding usa' such that the amount of unsoundness in usa' is extremely small. In other words, in the context of pointer analysis, usa' is almost the same ssa', except a few missing points-to edges.

Notice that usa' is unsound with respect to ssa'. Such unsound algorithms can be determined using a probabilistic approach for certain classes of data flow problems.

Possible bug paths are preferably determined using test cases. Both unit tests and regression tests provide hints for identifying possible bug paths. The test cases that fail for a program for computing the possible bug paths can be used. Let T be the set of test cases that fail for a program P. Let Pt be the projection (that is, coverage) of the P with respect to T. Pt can be used as the bug paths and standard (sound) data flow analysis algorithms can be applied to compute data flow information and use the result to detect possible bugs.

Considering the example program shown in FIG. 1 and the following unit test case:

```
int main( ) {
  Foo(0);
}
```

The test case will fail because the variable x is uninitialized and *q is aliased with x. The coverage of this test case is given below. The pieces of code that will not be exercised by the test case were commented out as shown in FIG. 4 (and indicated by /* . . . */ characters). Now, if a flow sensitive data flow analysis is applied to the program in FIG. 4, we obtain the points-to graph illustrated in FIG. 2D at statement 2. Note that the points-to is sound with respect to the projected code shown in FIG. 4, even though the points-to graph is unsound with respect to the original code shown in FIG. 1. One can use the resulting data flow analysis for fault localization.

Unsound static analysis tools may be developed, e.g., based on BEAM (see, e.g., Daniel Brand in "A software falsifier", in 11th International Symposium on Software Reliability Engineering, 2000) within the context of testing environment and service center (aka Bugzilla) environment.

In accordance with one embodiment, whenever a test case fails or when a bug report is registered, the tool creates the bug's path and then applies the BEAM analysis to automatically generate a possible diagnosis for the defects and register the diagnosis as part of defect. Ultimately, a user can use the BEAM diagnosis to localize the fault or could tailor BEAM further to help isolate the fault.

Unsoundness and conservativeness impact on the application of static analysis, such as bug detection. Meet over possible bug paths can be used with failed test cases to identify possible bug paths and use only these paths for computing data flow information. A framework may be built that integrates testing and static analysis to find bugs in programs in accordance with the present invention.

Figure 5:
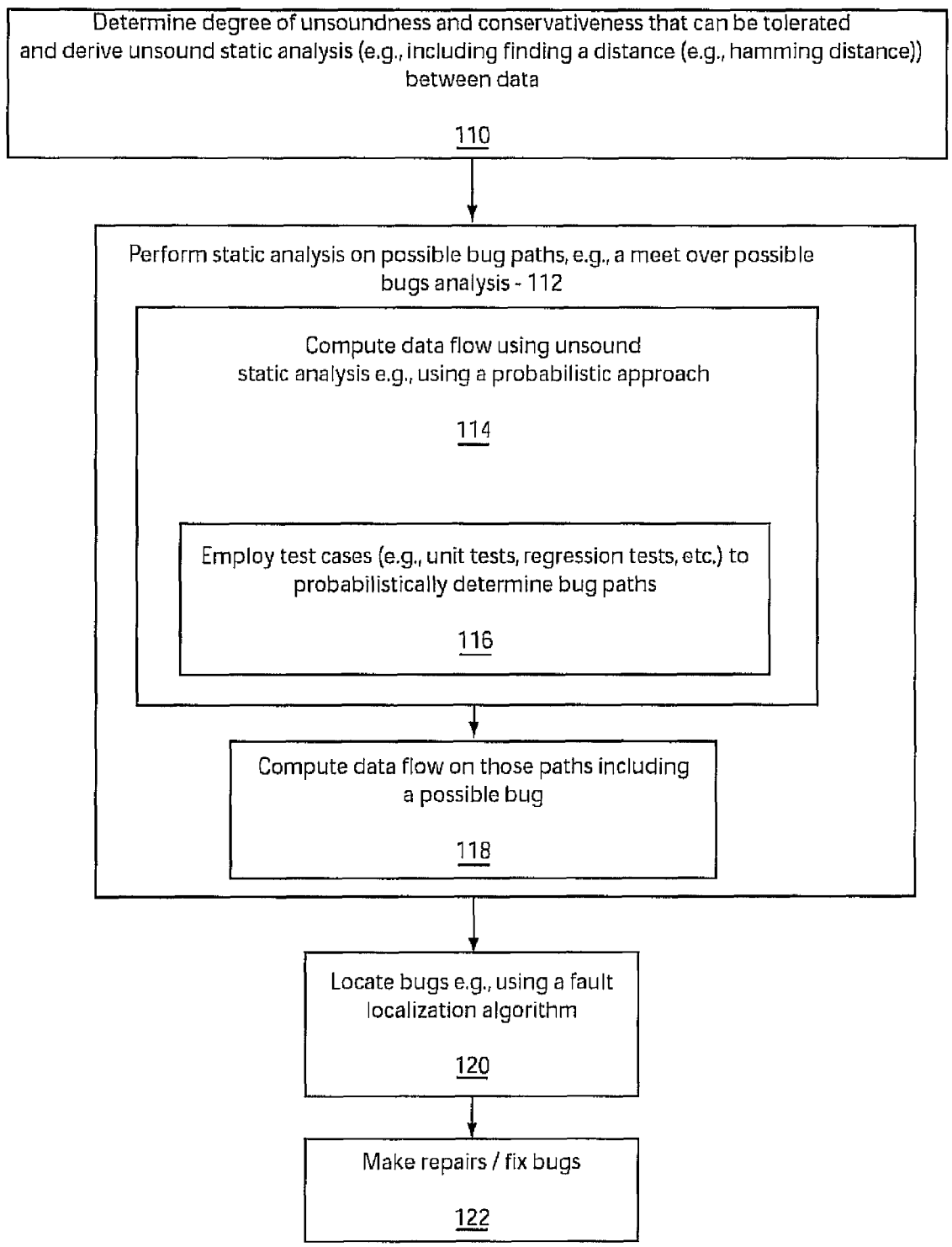
FIG. 5 is a block/flow diagram showing a system/method for analyzing a program using an unsound static analysis in accordance with one embodiment of the present invention.

Referring to FIG. 5, a block/flow diagram showing a system/method for debugging programs is illustratively shown. In block 110, a degree of unsoundness and conservativeness for data flow information that can be tolerated for a given program is determined, For example, is the program demands a highly accurate result or is considered extremely important, the unsoundness that could be tolerated may be very low. The unsoundness may be based on user-selected criteria or a user selected degree of unsoundness for the program. Alternately, the degree of unsoundness may be determined by objective criteria. In one embodiment, soundness (or unsoundness) may measured by measuring a distance, e.g., a hamming distance, between reference data (ideal data) and actual data received from an unsound instance or program being considered.

In one example, bit strings may be employed to encode data flow information. For instance, a bit may be associated for each pair of variables (x, y) at a particular point p in a program. If x points to y, the bit is set to 1; otherwise, the bit is set to 0. Given two data flow information sets, D1 and D2, encoded using bit strings, the data flow hamming distance (DFHD) can be defined for D1 and D2 as the number of places where the bits differ. For example, let D1=011001 and let D2=111010, then DFHD between D1 and D2 is 3.

In block 112, a meet over possible bug paths (mobp) analysis is performed. A reason for having unsoundness is that not all paths have been examined. Unsoundness may be examined with respect to a specific application, e.g., that of finding bugs and defects. A consequence of analyzing all paths and the subsequent merging of information is increased conservativeness of the data flow information. From the perspective of bug detection, the more conservative the data flow information is, the higher the number of false positives. Bugs do not usually occur on all paths, but occur only on certain paths (bugs that occur on all paths are easy to find and fix, so such bugs are of lesser concern).

In block 114, the data flow information is computed only on those paths that possibly trigger a bug. This will reduce the number of false positives. Meet over possible bug paths (mobp) can be defined similarly to moap, except that the data flow information is computed only on possible bug paths. Bug paths may be determined by testing the program and using statistical analysis to determine the most likely bug paths.

In block 114, using the unsound static analysis (usa) approach (e.g., not all paths are computed) compute some data flow information using a probabilistic approach for certain classes of data flow problems. In block 116, possible bug paths are preferably determined using test cases. Both unit tests and regression tests provide hints for identifying possible bug paths. The test cases that fail for a program for computing the possible bug paths can be used. Let T be the set of test cases that fail for a program P. Let Pt be the projection (that is, coverage) of the P with respect to T. Pt can be used as the bug paths and standard (sound) data flow analysis algorithms can be applied to compute data flow information and use the result to detect possible bugs. One can use the resulting data flow analysis for fault localization.

In block 118, data flow is computed over the identified possible bug/defect paths. Whenever a test case fails or when a bug report is registered, the bug's path is created and then an analysis is applied to automatically generate a possible diagnosis for the defects and register the diagnosis as part of the defect. In block, 120, a user may employ a fault localization algorithm or tool to determine a type and location of a fault or bug. In one example, a BEAM diagnosis is employed to localize the fault or to help isolate the fault. In block 122, bug are fixed or otherwise addressed.

Figure 6:
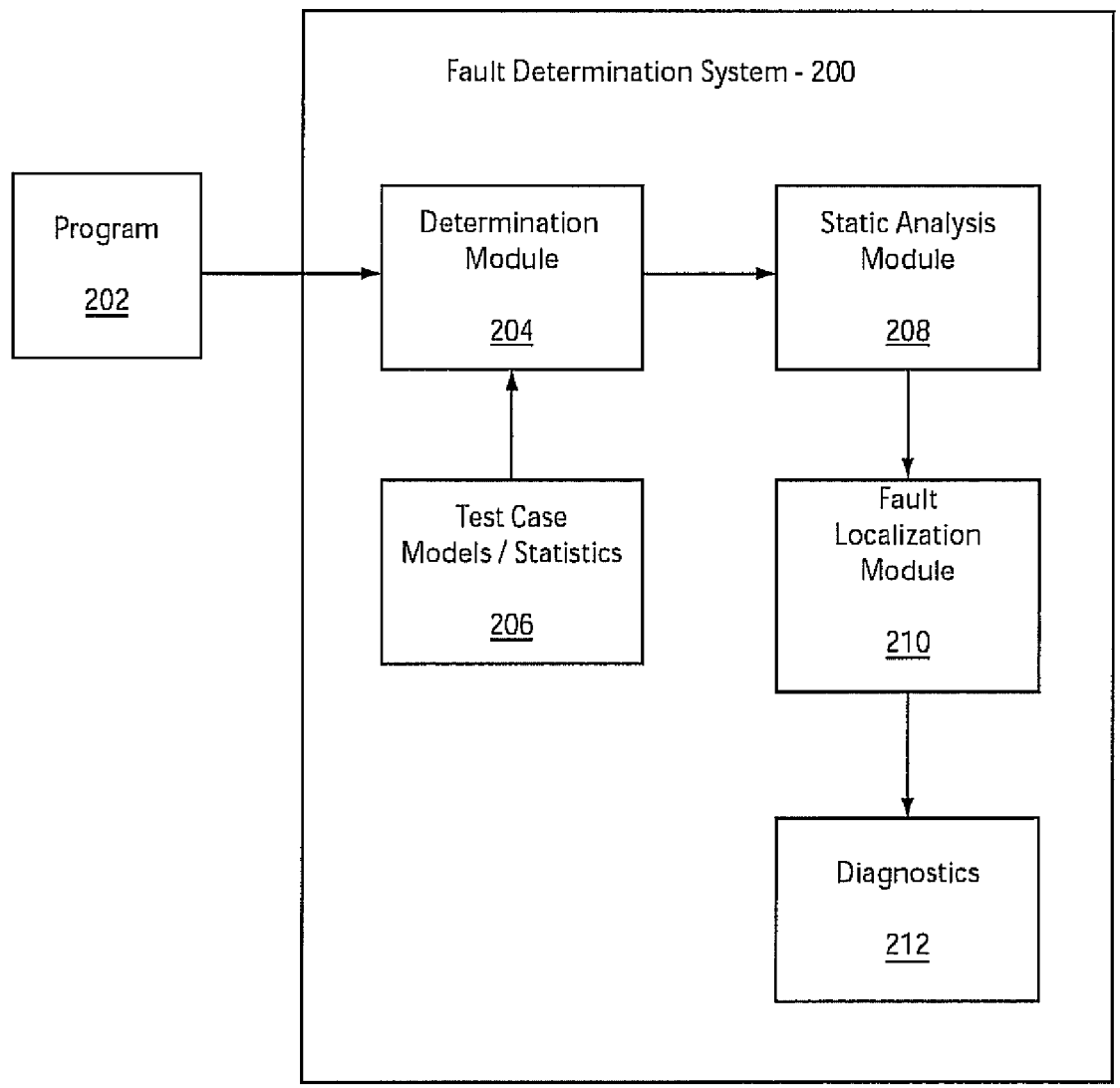
FIG. 6 is a block diagram showing a system for analyzing a program using an unsound static analysis in accordance with another embodiment of the present invention.

Referring to FIG. 6, a system 200 for determining faults in a program is illustratively shown. System 200 may include any computer system or network, be included in a program storage device, etc. System 200 may include the appropriate interfaces to permit user interactivity with the system, or system 200 may include a stand alone tool that functions independently from user interaction.

A program 202 may be input to system 200 for a static analysis in accordance with the present invention. System 200 may include a compiler or other processing equipment that is capable of analyzing programs.

A determination module 204 identifies possible bug paths in a program based on statistical analysis of test cases 206 (test case models/statistics). Statistics on which portions of programs or which types of code typically generate faults may be employed. In one embodiment, a previous version of the same program may be used or the same version of the program may be used. Test cases may include e.g., unit tests and/or regression tests.

A static analysis module 208 performs a static analysis only on the possible bug paths identified by the determination module 204. This may include a meet over possible bug paths analysis. In one embodiment, a degree of unsoundness is determined to dictate how the unsound static analysis (usa) is performed.

Once analyzed a fault localization module 210 locates the bugs in the program. The fault localization module 210 may perform a BEAM analysis, for example. The bugs or defects may then be corrected by a user or by the system or by another program or system. Fault localization module 210 may provide diagnostics 212 for fixing or classifying bugs or defects in the program.

Having described preferred embodiments of a system and method for static analysis using fault paths (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for analyzing a program, comprising the steps of:

determining possible bug paths in a program using a processor based on statistics of at least one of type and location of bugs in test cases;

performing a static analysis using the processor only on the possible bug paths; and locating the bugs in the program.

2. The method as recited in claim 1, wherein the step of determining includes performing a meet over possible bug paths (mobp) analysis which includes determining possible bug paths based on statistics of type and location of bugs in test cases.

3. The method as recited in claim 2, wherein the test case programs include unit tests and/or regression tests.

4. The method as recited in claim 1, further comprising determining fault locations in the program using a fault localization algorithm.

5. The method as recited in claim 1, wherein the statistics are determined based upon failed test cases.

6. A computer program product comprising a non-transitory computer readable storage medium including a computer readable program for analyzing a software program, wherein the computer readable program when executed on a computer causes the computer to perform the steps of:

determining possible bug paths in a program based on statistics of at least one of type and location of bugs in test cases;

performing a static analysis only on the possible bug paths; and locating the bugs in the program.

7. The computer program product as recited in claim 5, wherein the step of determining includes performing a meet over possible bug paths (mobp) analysis which includes determining possible bug paths based on statistics of type and location of bugs in test cases.

8. The computer program product as recited in claim 6, wherein the test case programs include unit tests and/or regression tests.

9. The computer program product as recited in claim 6, further comprising determining fault locations in the program using a fault localization algorithm.

10. The computer program product as recited in claim 6, wherein the statistics are determined based upon failed test cases.

11. A system for determining faults in a program, comprising:

a determination module stored on a non-transitory computer readable storage medium which identifies possible bug paths in a program based on statistics of at least one of type and location of bugs in test cases;

a static analysis module which performs a static analysis only on the possible bug paths identified by the determination module; and a fault localization module which locates the bugs in the program.

12. The system as recited in claim 11, wherein the determination module includes a meet over possible bug paths (mobp) analysis program which determines possible bug paths based on statistics of type and location of bugs in failed test cases.

13. The system as recited in claim 11, wherein the test case programs include unit tests and/or regression tests.

14. The system as recited in claim 11, wherein the fault localization module performs a BEAM (Bugs Errors And Mistakes) analysis.

15. The system as recited in claim 11, wherein the statistics are determined based upon failed test cases.

* * * * *